United States Patent [19]
Kosarko et al.

[11] 3,825,327
[45] July 23, 1974

[54] SOUND MOTION PICTURE CAMERA

[75] Inventors: Gerald Julius Kosarko, Pavillion; Ronald Charles Holzhauser, Holley; Edgar Samuel Marvin, Rochester, all of N.Y.

[73] Assignee: Eastman Kodak Company, Rochester, N.Y.

[22] Filed: Feb. 20, 1973

[21] Appl. No.: 333,588

[52] U.S. Cl. ............... 352/29, 352/14, 352/72, 352/74
[51] Int. Cl. ............................. G03b 23/02
[58] Field of Search ............ 352/27, 29, 30, 72, 74, 352/78, 157, 159, 14; 274/4 D

[56] References Cited
UNITED STATES PATENTS

| | | |
|---|---|---|
| 2,372,637 | 3/1945 | Williamson et al. ............... 352/74 |
| 2,449,626 | 9/1948 | Suthann ............................... 352/74 |
| 3,025,751 | 3/1962 | Braun .................................. 352/14 |
| 3,048,081 | 8/1962 | Biedermann et al. ............... 352/27 |
| 3,244,469 | 4/1966 | Hennessey et al. ................. 352/14 |
| 3,244,470 | 4/1966 | Hennessey .......................... 352/29 |
| 3,300,270 | 1/1967 | Finnerty .............................. 352/29 |
| 3,447,865 | 6/1969 | Bottani ................................ 352/27 |
| 3,547,331 | 12/1970 | Hereford ............................ 352/159 |
| 3,597,056 | 8/1971 | Sasaki ................................. 352/14 |

*Primary Examiner*—Joseph F. Peters, Jr.
*Assistant Examiner*—Alan Mathews
*Attorney, Agent, or Firm*—John Morrow

[57] ABSTRACT

A sound motion picture camera is adapted to receive a sound film cartridge to record both images and sound onto a film strip carried by the cartridge. The camera includes a sound transducer for recording sound, a pressure member for cooperating with the film to support the film closely adjacent to the sound transducer, guide means for guiding the film strip past the transducer, a capstan drive and a cooperating pressure roller for advancing the film strip as a sound sequence is being recorded, a cartridge ejecting member for at least partially removing a film cartridge from the cartridge chamber of the camera, and a latching member for securing a door to the cartridge chamber. In the camera, the pressure member, the guide means, the pressure roller, the cartridge ejecting member and the latching member are selectively movable by a conditioning mechanism for permitting the cartridge and film strip to be readily inserted into the camera to permit recording of images and sound onto the film strip, or for ejecting the cartridge and the film strip from the cartridge chamber of the camera.

23 Claims, 9 Drawing Figures

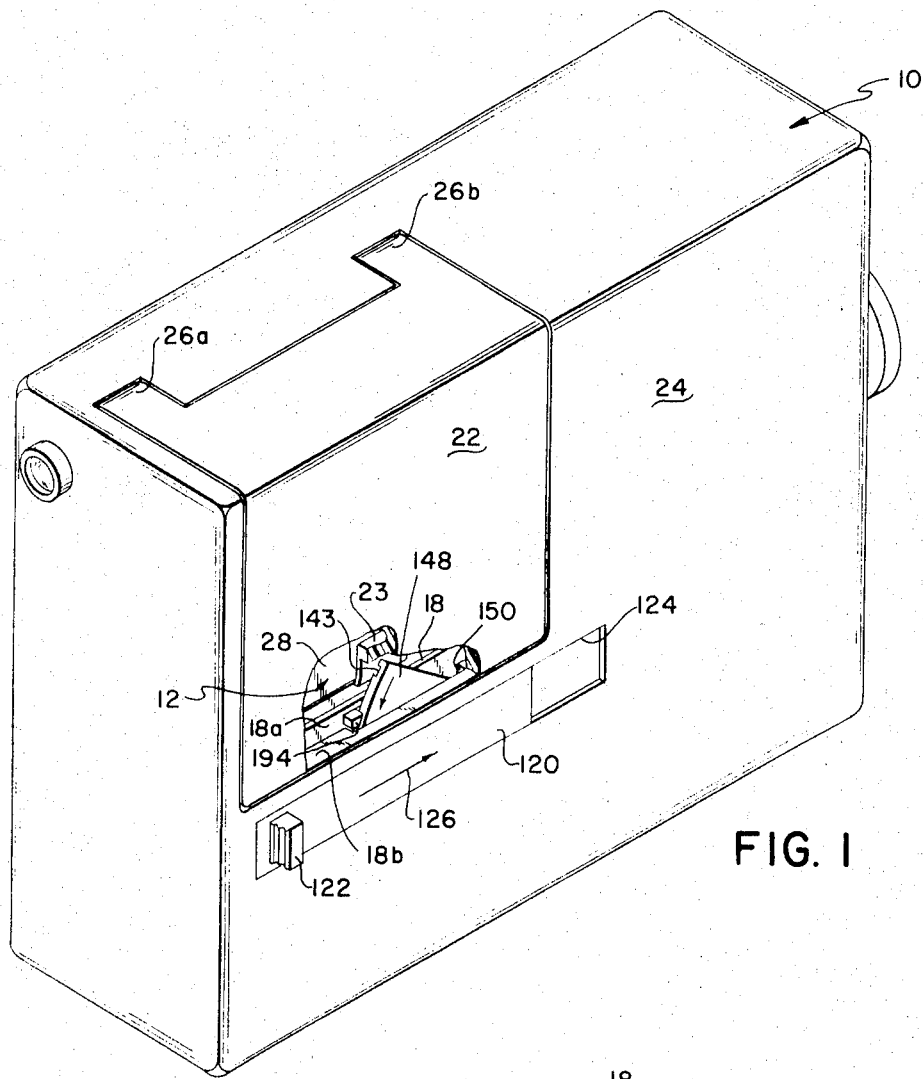
FIG. 1
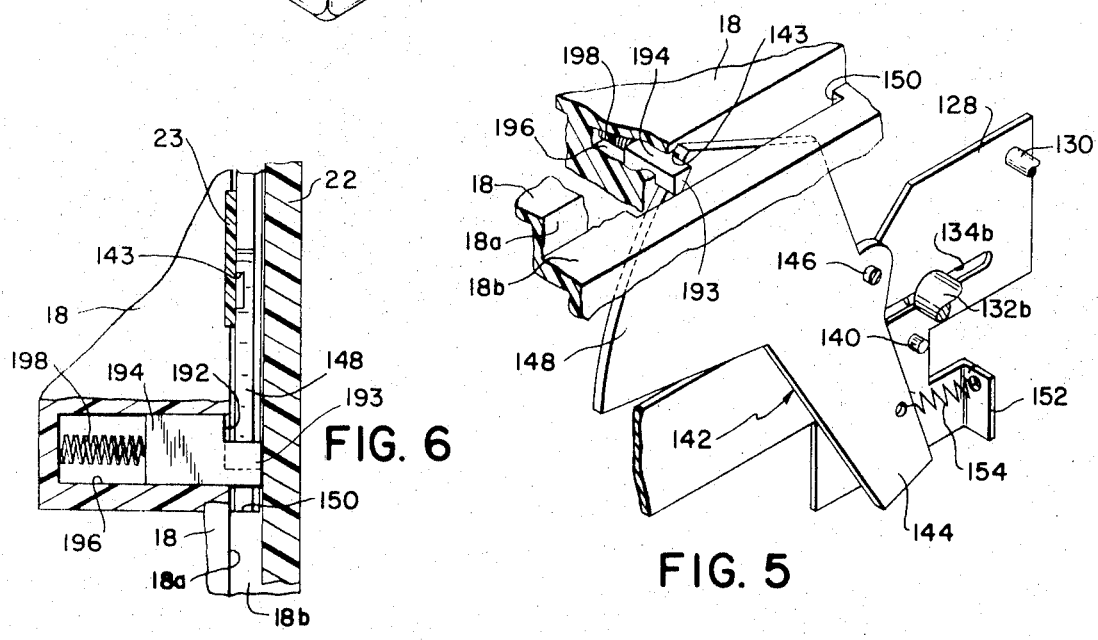
FIG. 6
FIG. 5

PATENTED JUL 23 1974 3,825,327

SOUND MOTION PICTURE CAMERA

CROSS-REFERENCE TO RELATED APPLICATIONS

Reference is made to commonly assigned copending U.S. Pat. application Ser. No. 291,135, entitled, "SHROUD FOR SOUND MOTION PICTURE CAMERA" filed Sept. 21, 1972, in the name of Kosarko; U.S. Pat. application Ser. No. 294,711, entitled, "PRESSURE RELIEF MECHANISM" filed Oct. 3, 1972 in the name of Marvin, U.S. Pat. application Ser. No. 248,513, entitled, "FILM CARTRIDGE" filed Apr. 28, 1972 in the name of Kosarko et al.; and U.S. Pat. application Ser. No. 256,552, entitled, "FILM CARTRIDGE WITH GUIDE FINGER" filed May 24, 1972 in the name of Kosarko et al.

BACKGROUND OF THE INVENTION

1. Field Of The Invention

This invention relates to a control or conditioning mechanism for a camera apparatus which is adapted to receive and continuously advance an elongate strip of web material. More specifically, the invention relates to a mechanism for controlling the movement of a pressure member, film guides, a pressure roller, a loop sensor, an ejecting mechanism and a door latching member for a sound motion picture camera so as to permit a sound cartridge and a film strip supported thereby to be readily removed from the cartridge chamber of a sound motion picture camera or positioned therein for simultaneous recording of scenes and images onto the film strip.

2. Description Of The Prior Art

Door latching mechanisms for permitting access to the film chambers of motion picture cameras are generally well known as are ejecting mechanisms for removing cartridges from the film chambers of motion picture cameras. Also, guiding members, sound recording apparatus and drive synchronizing devices such as found in a sound motion picture camera are generally known and have been previously described, such as in commonly-assigned copending U.S. Pat. application Ser. No. 291,135. Although the prior art discloses mechanisms for separately conditioning latching mechanisms, ejecting mechanisms, guide members and recording apparatus, the prior art mechanisms are not readily adaptable for use in a sound motion picture camera wherein it is desired to provide a single control mechanism for permitting easy removal of a sound cartridge from the cartridge chamber of the camera or for permitting the sound cartridge to be positioned in the cartridge chamber of the camera for the simultaneous recording of sounds and images onto a film strip supported by the cartridge.

SUMMARY OF THE INVENTION

Accordingly, it is an object of the present invention to provide a control mechanism for selectively moving a cooperating pressure roller away from the capstan of a sound motion picture camera to permit a film strip to be selectively positioned between the capstan and the pressure member or to permit the film strip to be withdrawn therefrom while also controlling separate film guides, pressure member and loop sensor of the camera.

Another object of the present invention is to provide a control mechanism for selectively latching and unlatching the door of a sound motion picture camera and for moving the pressure member, the pressure roller, the loop sensor and the film guides to permit a film strip to be removed from the camera or to be positioned between the sound transducer and the pressure roller and between the pressure roller and the capstan of the camera and to position the film strip relative to the film guides.

It is a further object of the present invention to provide a conditioning mechanism for latching and unlatching the door to the cartridge chamber of a camera, for moving a pressure member, a pressure roller, a loop sensor and film guides into and out of a desired position relative to the film path for urging the film against the sound transducer and capstan, and for maintaining the film in position relative to the transducer and capstan while the camera is recording sound thereon.

It is still a further object of the present invention to provide a mechanism for a sound motion picture camera which is adapted to unlatch the door to the cartridge chamber of the camera, and to retract a pressure member away from the sound transducer and to retract the film guides, the loop sensor and the pressure roller away from the film path so as to permit the film to be readily inserted or removed therefrom and also to provide a cartridge ejecting means to assist in the removal of the cartridge from the camera.

According to a preferred embodiment of the present invention, a sound motion picture camera includes transducer means for recording sound onto a received film strip, drive means for driving the film strip past the transducer means, guide means for guiding the film past said transducer means, a loop detector for sensing the size of a film loop, and means for conditioning the transducer means, the drive means, the guide means and the detection means between, (1) an extended position wherein the sound motion picture camera is operated to simultaneously record sound and scene images onto the film, and (2) a retracted position wherein the film strip and a supporting cartridge can be received into the camera or removed therefrom.

BRIEF DESCRIPTION OF THE DRAWINGS

In a detailed description of a preferred embodiment of the invention presented below, reference is made to the accompanying drawings in which:

FIG. 1 is a perspective view, partially broken away, of a sound motion picture camera incorporating the control or conditioning mechanism of the present invention;

FIG. 5 is a fragmentary perspective view showing a portion of the latching mechanism of the camera;

FIG. 6 is a fragmentary cross-sectional view of a portion of the latching mechanism shown in FIG. 5;

DESCRIPTION OF THE PREFERRED EMBODIMENT

Because photographic apparatus are well known, the present description will be directed in particular to elements forming a part of, or cooperating more directly with the present invention, apparatus not specifically shown or described herein being understood to be selectable from those known in the art.

A "sound" film cartridge especially suitable for cooperating with a preferred embodiment of the present invention has been recently developed by modifying a "silent" cartridge of the type disclosed in commonly assigned U.S. Pat. No. 3,208,686 entitled, "FILM CARTRIDGE" issued on Sept. 29, 1965 in the names of E. A. Edwards et al. The sound cartridge includes an aperture which permits sound recording upon a film strip loaded in the cartridge. Certain features of the sound cartridge are disclosed in commonly assigned copending U.S. Pat. application Ser. No. 248,513, entitled "FILM CARTRIDGE" filed Apr. 28, 1972 in the name of Kosarko et al., and Ser. No. 256,552, entitled, "FILM CARTRIDGE WITH GUIDE FINGER" filed May 24, 1972 in the name of Kosarko et al., and such disclosures are included herein by this reference. Since this sound cartridge includes many of the features of the cartridge disclosed in the Edwards et al patent and the camera including the mechanism of the present invention is suitable for use with a silent or non-sound cartridge of this type as well, the disclosure of that patent also is included herein by reference.

Figure 2:
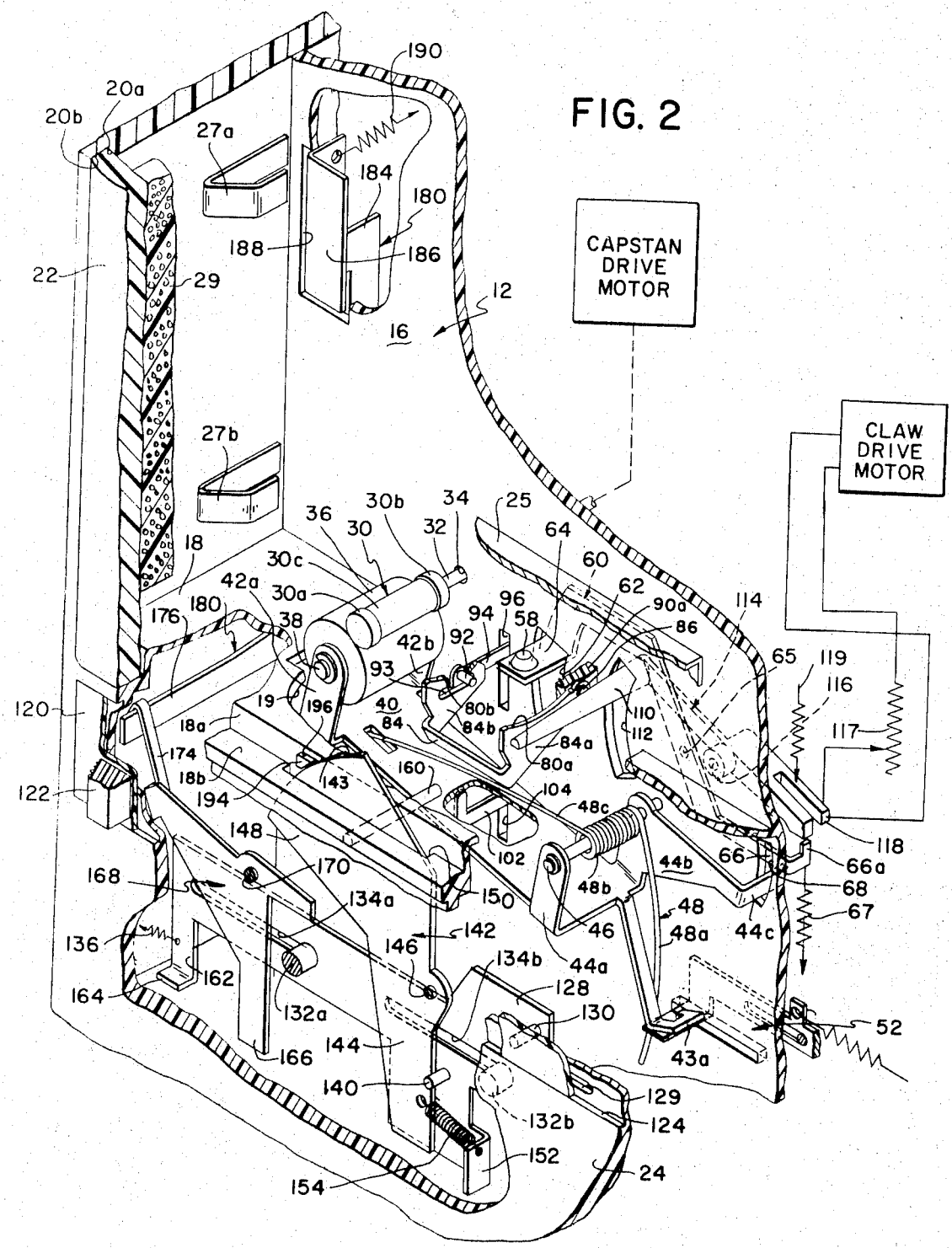
FIG. 2 is a fragmentary perspective view of the mechanism of the invention with certain portions of the camera shown in FIG. 1 being broken away or omitted.

Referring now to the drawings, a portion of a sound motion picture camera 10 has a cartridge chamber 12 for receiving either a sound film cartridge or a silent film cartridge. As illustrated by way of example, cartridge chamber 12 is defined by walls 14, 16, 18 and 20 and a cover 22 which is hinged to the body of housing 24 of the camera at 26a and 26b. The walls include offset portions, such as 18a, 18b and 20a, 20b, which mate with edges of the cover 22 as shown in FIG. 2 to insure that the cartridge chamber 12 is light-tight whenever the cover 22 is in its closed (FIGS. 1 and 2) position. A film claw (not shown) projects through wall 14 during movement along a generally rectilinear path for intermittently advancing frames of film through the cartridge past an exposure aperture (not shown) in wall 14 for exposing scene images upon the film in a known manner.

As explained in more detail in U.S. Pat. application Ser. No. 291,135, a silent cartridge of the type disclosed in the before-mentioned Edwards et al. patent can be positioned in the cartridge chamber 12 above a shroud member 25 on wall 16 (shown partially broken away in FIG. 2). A silent cartridge is resiliently held in position by springs 27a and 27b supported by the rear wall 20 and by a pad of resilient material 29 affixed to the cover 22. Whenever a sound cartridge 28 (FIGS. 1, 3, 4 and 8) is located into the cartridge chamber 12, the shroud member 25 aids in guiding the sound cartridge and the film F into the chamber 12, and the shroud 25 is positioned in an aperture 29 (FIGS. 3 and 4) in the cartridge that is adapted to receive certain sound recording elements of the camera.

In a preferred embodiment of the camera, a capstan 30 is secured to a shaft 32 which extends into the chamber 12 through an opening 34 in wall 16. Shaft 32 is driven by a suitable means such as an electric motor (shown schematically in FIG. 2), for driving the capstan 30 at a substantially uniform speed during operation of the camera. The circumferential surface of capstan 30 is undercut or otherwise contoured to define end portions 30a and 30b and a reduced central portion 30c. The width and depth of the central portion 30c preferably is slightly greater than that of a received film strip so that the surface of a cooperating pressure roller 36 can be resiliently urged into contact with the end portions 30a and 30b of the capstan 30, thus permitting the pressure roller to be driven by the capstan while the film strip is received between the end portions 30a and 30b. This arrangement of the capstan 30 and the pressure roller 36 permits the film strip to remain substantially free of the resilient force between the pressure roller 36 and the end portions 30a and 30b of the capstan 30 and thereby prevents unnecessary scratching or surface distortions upon the received film strip. The surfaces of end portions 30a and 30b of capstan 30 and the circumferential surface of roller 36 are preferably made of a material having a high coefficient of friction so as to impart a substantially uniform rate of rotation to roller 36 so that the film strip is driven smoothly by the roller. It has been found to be advantageous to have the pressure roller 36 engage capstan 30 at an angle which is offset to the plane of the film such that the film is partially wrapped around the surface of roller 36 to impart a more positive drive of the film. The angle of offset which has been found to best serve this purpose is an angle of approximately 30°.

As shown in FIG. 2, the pressure roller 36 is rotatably supported by a shaft 38 which passes through ends 42a and 42b of a bracket 40. The bracket 40 is pivotally mounted about a shaft 46 which passes through openings in spaced tabs 44a and 44b. Shaft 46 extends substantially parallel to the shaft 38 and it is secured to the cartridge chamber side of the wall 16 below wall 18. In the preferred embodiment, a torsion spring 48 is mounted with a coil portion 48b of the spring surrounding shaft 46 between tabs 44a and 44b. A first leg portion 48c is affixed to bracket 40 and a second leg portion 48a is positionable to cooperate under tension with a "U-shaped" end 43a of bracket 40. As described in detail in commonly-assigned U.S. Pat. application Ser. No. 294,711, entitled "PRESSURE RELIEF MECHANISM" filed Oct. 3, 1972 in the name of Marvin, the bracket 40 is pivotable about shaft 46 from the position shown in solid to the position shown in phantom in FIG. 3, when a force is applied to the bracket by a torsion spring 48 in response to movement of a trigger assembly 52. Bracket 40 also is pivotable about shaft 46, against the urging of torsion spring 48, by an arm or pin 160 which is actuable to apply force to bracket 40 through the control mechanism of the camera as will be described in greater detail later. It should be noted that arm 160 is effective to pivot bracket 40 in a direction to move roller 36 from its engaged (FIGS. 2 and 3) position wherein the roller is in engagement with the capstan toward its retracted (FIG. 4) position, wherein roller 36 is moved through opening 19 in wall 18 to a position below wall 18 such that the film strip F may be readily inserted (or removed from) between the capstan and the retracted roller.

Figure 3:
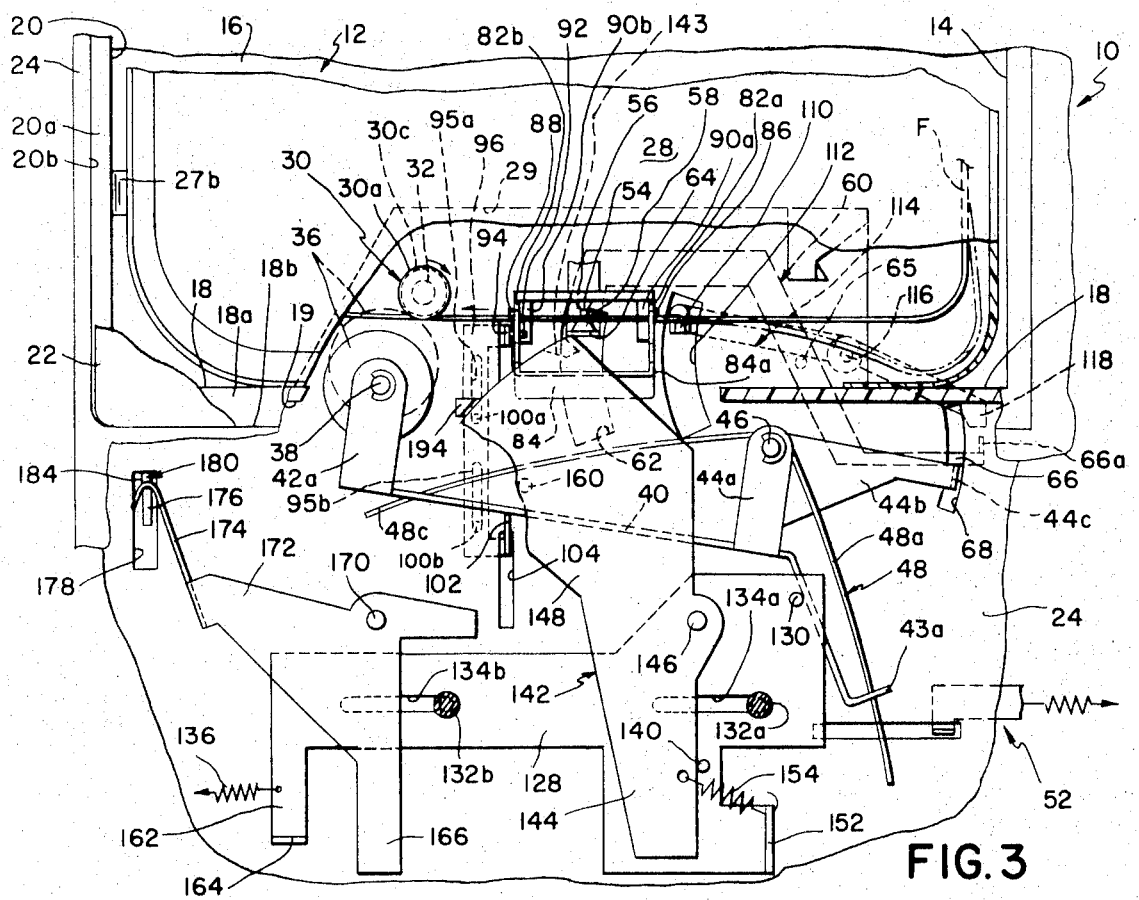
FIG. 3 is a fragmentary plan view of the embodiment of the present invention as shown in FIG. 1 showing certain portions of the camera cooperating with a sound film cartridge of a type suitable for use in the camera.
Figure 4:
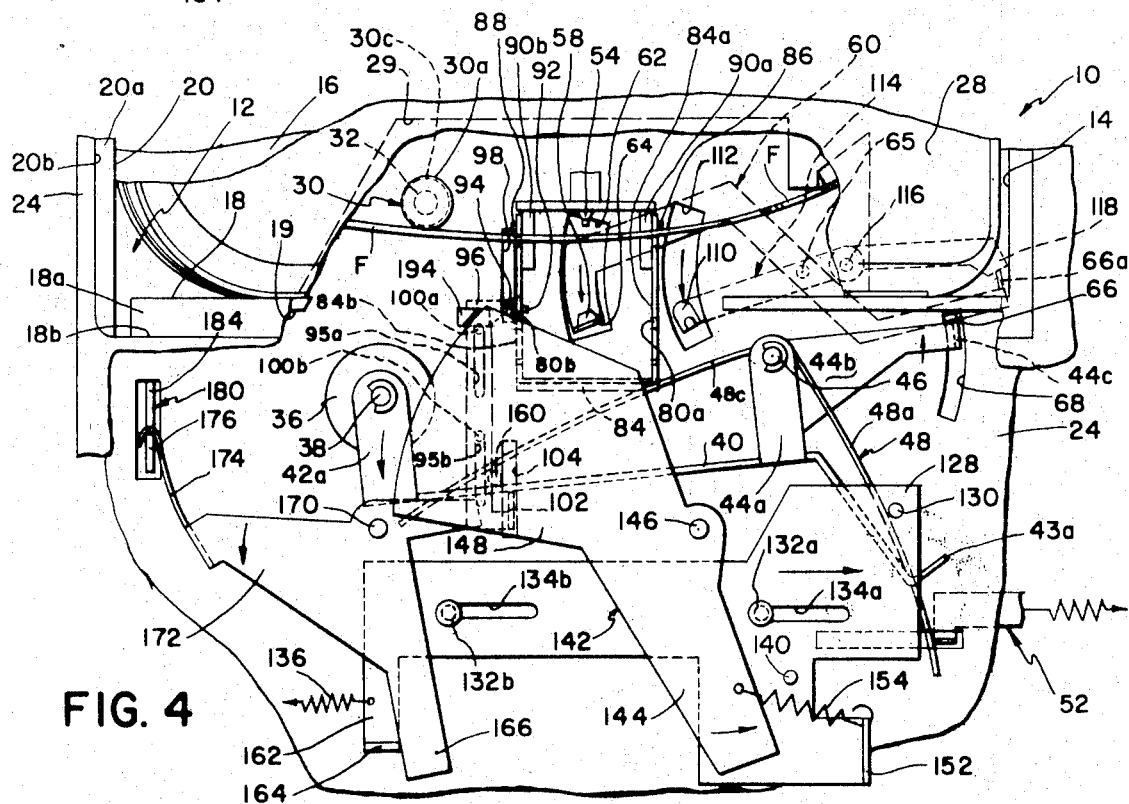
FIG. 4 is a fragmentary plan view similar to FIG. 3 but showing certain members of the mechanism in a withdrawn or retracted position and showing a sound cartridge and the film therein being ejected from the cartridge chamber of the camera.

As best shown in FIGS. 3 and 4, a suitable sound head or transducer 54 is firmly supported in the cartridge chamber 12 by a support member 56 which is secured to wall 16. A received strip of film F is urged into contact with the transducer 54 for recording of sound onto the film by a pressure member 58 which is affixed to an end 64 of an irregularly shaped arm 60. Arm 60 is pivotally mounted on the backside of wall 16 by a stud shaft 65 such that end 64, which is bent substantially perpendicular to the main portion of arm 60, is pivotable through an arcuate opening 62 in wall 16. As shown in FIG. 2, pressure member 58 is urged toward the transducer 54 by a spring 67 secured to an extension 66 of the arm 60. Arm 60 also has a tab portion 62 for a purpose to be described later. When pressure member 58 is urged into its FIG. 3 position by the force of spring 67, the film F is held in contact with the transducer 54 to assure high fidelity recording on a sound track of the film F as it is driven between the transducer 54 and the pressure member 58 by operation of the capstan 30 and the roller 36.

A tab portion 44c of bracket 40 extends through an opening 68 in wall 16, the opening 68 being positioned below wall 18 as shown in FIG. 2. The tab portion 44c cooperates with the extension 66 of arm 60 to pivot arm 60 in a counterclockwise direction about the stud shaft to move pressure member 58 away from its engaged or extended (FIG. 3) position toward a retracted (FIG. 4) position wherein the pressure member 58 is moved through the opening 19 to a position below wall 18 so as to permit a film strip F to be inserted between the sound transducer 54 and the pressure member 58 or to permit the film strip F to be removed from therebetween. Movement of the tab portion 44c of bracket 40 for causing the related movement of arm 60 is controlled by the arm 160 of the control mechanism of the present invention as described later.

Figure 9:
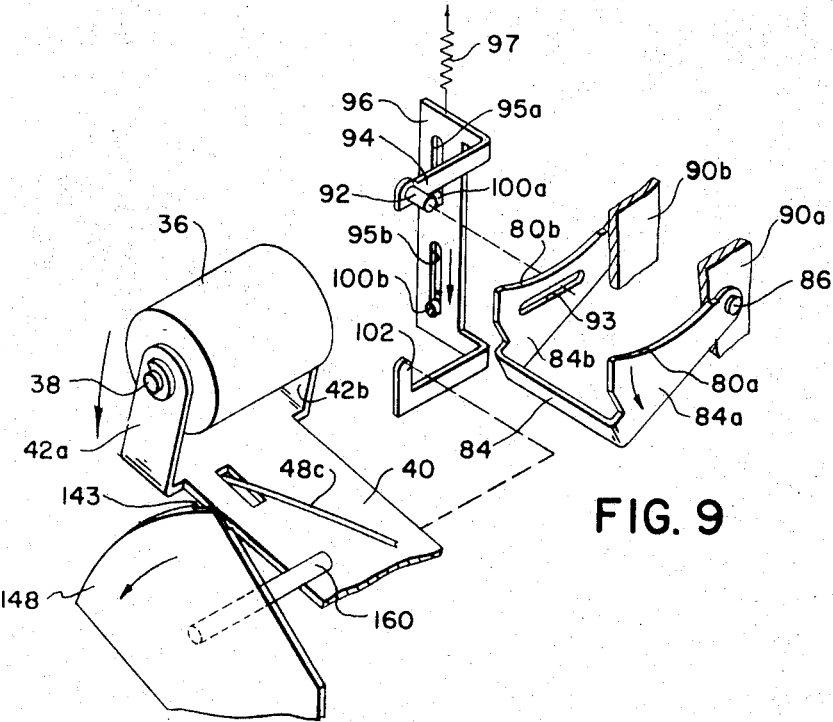
FIG. 9 is a fragmentary exploded view of the mechanism for controlling the film guides of the camera.

Referring now to FIGS. 3, 4 and 9, a pair of film guides 80a, 80b are movably supported along the film path at opposite sides of the sound transducer 54. The film guides 80a, 80b cooperate with a pair of guide members, 82a, 82b, at the side edges of support member 56 to guide the film F accurately past the sound head when the film is being advanced by the capstan 30 and the pressure roller 36. The film guides 80a, 80b are supported by an arm 84 which is mounted for pivotal movement about pivot studs 86 and 88 of supports 90a and 90b (see FIG. 9), the pivot studs passing through openings in extensions 84a and 84b of arm 84. Arm 84 is pivoted about studs 86 and 88 by a shaft 92 which projects into an elongate opening 93 in extension 84b and cooperates with the edges of the openings in a cam type of action as will now be explained in greater detail.

As shown in FIGS. 2 and 9, the shaft 92 is secured to end 94 of a bracket 96, the bracket being slidably secured to the backside of wall 16 by rivets 100a, 100b which pass through elongate openings 95a, 95b respectively. End 94 of bracket 96 extends through slot or opening 98 in wall 16. Bracket 96 is resiliently urged upward by spring 97 toward its FIG. 2 position wherein film guides 80a and 80b are located to cooperate with guide members 82a, 82b in guiding the film. Bracket 96 also includes an arm 102 which is positioned through an opening 104 in wall 16 under bracket 40 and is held closely adjacent thereto through the urging of spring 97. When bracket 40 is pivoted from the engaged (FIGS. 2 and 3) position toward the retracted (FIG. 4) position, bracket 40 urges arm 102 of bracket 96 to move downwardly against the urging of spring 97. Movement of bracket 96 in the downward direction results in shaft 92 sliding in opening 93 or arm 84 thereby pivoting arm 84 downward. Continued movement of arm 84 withdraws the film guides 80a and 80b below the surface of wall 18 so as to permit the film to be readily inserted between, or to be removed from between, the film guides 80a, 80b and the guide members 82a, 82b.

As shown in FIGS. 2, 3 and 4, the sound motion picture camera 10 further includes a finger-like loop sensor 110. Loop sensor 110 is movable in an arcuate slot 112 in wall 16 to cooperate with the film F adjacent to the film guide 80a and thereby sense the size of a film loop (and thus the length of film) between the transducer 54 and the exposure aperture (not shown) of the camera. According to accepted standards for 8 millimeter sound film, there should be 18 frames of separation maintained between the exposure aperture and the transducer 54. The loop sensor 110 is secured to an arm 114 which is pivotally mounted about a shaft 116 which is affixed to the backside of wall 16. Arm 114 includes a portion 118 which is coupled to suitable control means, such as a variable resistor 117, for regulating the speed of the film claw (not shown) relative to the capstan 30 so that substantially 18 frames of film is maintained between the exposure aperture and the transducer 54. In the preferred embodiment of the sound motion picture camera, the loop sensor 110 is urged into the sensing (FIGS. 2 and 3) position by a spring member 119 which applies force to end 118 of the loop sensor 110. The loop sensor 110 is movable by the tab portion 66a on arm 60 contacting a portion of end 118 to move the loop sensor from the sensing position wherein the loop sensor controls the pull down claw to maintain the desired frame separation for recording sound onto the film into its retracted (FIG. 4) position wherein the loop sensor 110 is pivoted along opening 112 through the opening 19 in wall 18 to a position below wall 18 of the cartridge chamber 12 to facilitate loading and unloading of the cartridge and film into the cartridge chamber.

Now to discuss in greater detail a preferred embodiment of the control mechanism as shown in the drawings, reference is first made to FIG. 1 wherein the sound motion picture camera 10 includes an outer slide 120 with an extension 122 that is positioned outside the housing 24 of the camera so that it is readily accessible for movement by the operator of the camera. Slide 120 moves laterally in an opening 124 in housing 24. As shown in FIG. 2, the outer slide member 120 is securely coupled to an inner slide member 128 by a rivet 130 that extends through a slot 129 in housing 24 so that the slide members 120 and 128 move together. The inner slide member 120 is slidably mounted to the camera by rivets 132a and 132b which are secured to housing 24 and pass through openings 134a, 134b, respectively, in inner slide member 128. The slide members 120 and 128 are both urged to the left (toward the FIG. 1 position) by a spring 136 which is secured to slide 128 and to the housing 24 of the camera.

When in the FIG. 1 position, a pin 140 on the inner slide member 128 is in engagement with an end portion 144 of latching member 142 which is pivotally mounted to the inside portion of housing 24 by a pivot stud 146. As shown in FIGS. 1, 2 and 3, pin 140 cooperates with end portion 144 of the latching member 142 to maintain it in a position wherein a sector-shaped end portion 148 extends through an opening 150 in wall portion 18b to engage an L-shaped latching member or extension 23 that is secured to the cartridge chamber side of the cover 22. While the sector-shaped portion 148 of the latching member 142 is maintained in engagement with the extension 23, the cover 22 is held tightly secured in the closed (FIG. 1) position. Whenever the operator desires to release the cover 22 to remove a cartridge from the cartridge chamber 12 or to insert a cartridge therein, the operator need only move the outer slide member to the right (in the direction of arrow 126). Such movement of the outer slide member is effective to release cover 22 of the camera 10 to permit access to the cartridge chamber 12 and also causes related movement of other apparatus. More specifically, the latching member 142 is resiliently connected to a tab portion 152 of the inner slide 128 by a spring member 154, such that movement of the inner slide member 128 by the operator in the direction of arrow 126 pivots the latching member 142 in a counterclockwise direction about pivot stud 146. The counterclockwise movement of latching member 142 is effective to remove the sector-shaped portion 148 from engagement with the L-shaped latching member or extension 23 to release the cover 22 and thereby permit the cover to open for access to the cartridge chamber 12.

As shown in FIGS. 2, 3 and 4, arm 160 is affixed to the sector-shaped portion 148 of latching member 142 in a position above an intermediate portion of the bracket 40. Arm 160 is swung through an arcuate path in response to movement of latching member 142, and this movement in a counterclockwise direction is effective to move the bracket 40 to its retracted (FIG. 4) position wherein the pressure roller 36 is below the surface of wall 18. When bracket 40 is moved to this position, tab portion 44c of bracket 40 pivots arm 60 to also withdraw the pressure member 58 and the loop sensor 110 through opening 19 to a position below the surface of wall 18. Also, the movement of bracket 40 to its retracted (FIG. 4) position is effective, through bracket 96, to retract the film guides 80a, 80b as previously described.

Referring now to FIGS. 5 and 6, a recess or detent portion 143 is provided along a portion of the rear edge of the sector-shaped portion 148 of latching member 142. This detent portion 143 cooperates with a portion 192 of a plunger 194 to positively maintain the sector portion 148 in the retracted (FIGS. 4 and 5) position after the operator has moved slide 120 a predetermined distance to the right in the direction of arrow 126. When the sector-shaped portion 148 is maintained in the withdrawn (FIG. 5) position, the arm 160 restrains bracket 40 to the retracted (FIG. 4) position, wherein the pressure roller 36 is below the surface of wall 18. When bracket 40 is moved to this position, tab portion 44c of bracket 40 cooperates with the arm 60 to also withdraw the pressure member 58 and the loop sensor 110 through the opening 19 to a position below the surface of wall 18 as previously described. Also, bracket 40 cooperates with bracket 96 to retract film guides 80a, 80b to permit the operator to readily remove the sound cartridge 28 or insert the cartridge into the cartridge chamber 12. The retraction of the above-mentioned members to the FIG. 4 position permits the film F to be readily positioned along the film path which leads over loop sensor 110, between the film guides 80a, 80b and guide members 82a, 82b, which maintain the film in position between the sound transducer 54 and the film path then continuing between the capstan 30 and the pressure roller 36.

In the preferred embodiment, plunger 194 is slidably mounted in an opening 196 in wall 18. As shown in FIGS. 5 and 6, plunger 194 includes a portion 193 which is positioned to extend over the sector-shaped portion 148 to contact a portion of door 22 such that the door can hold the plunger 194 in a restrained (FIG. 6) position when the door is latched in the closed (FIG. 1) position. However, when the door is unlatched, a spring 198 urges the plunger 194 toward the engaged (FIG. 5) position opening the door 22 slightly and urging portion 192 of plunger 194 into engagement with the recess or detent portion 143 on the inner surface of the sector-shaped portion 148 by a spring 198, the force of spring 198 being sufficient to hold the portion 192 in the recess 143, thereby preventing the latching member 142 from either returning into engagement with latch member 23 or to be driven further in the counterclockwise direction by spring 154. When the latching member 142 is restrained in the withdrawn (FIG. 5) position by portion 192 of plunger 194, slide members 120 and 128 are also prevented from returning to the operative (FIG. 1) position under the urging of spring 136.

When the inner slide member 128 is moved to the extreme end of the travel of the rivets 132a and 132b in the openings 134a and 134b, a cartridge ejecting apparatus is actuated to eject the film cartridge 28 as is depicted in FIG. 4. The inner slide member 128 includes an extension 162 which has a tab end 164 bent substantially perpendicular to extension 162. The tab end 164 is positioned to cooperate with a leg portion 166 of an irregularly shaped, bell crank linkage member 168, the linkage member being pivotally secured to an inside portion of the housing 24 of camera 10 by a pivot stud 170. A second leg 172 of linkage member 168 includes a flexible hook portion 174 which slidably engages an arm 176 of an L-shaped ejecting member 180 to cause pivotal movement of the ejecting member 180 as will now be described.

Figure 7:
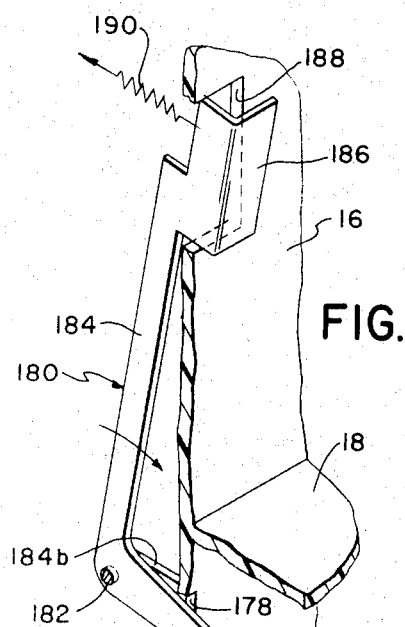
FIG. 7 is a fragmentary perspective view of the cartridge ejecting mechanism of the present invention.
Figure 8:
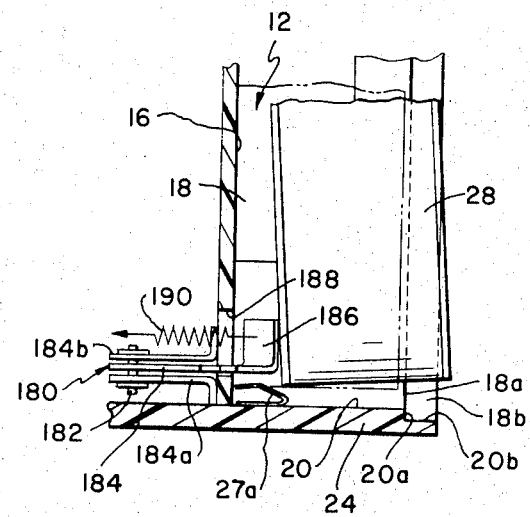
FIG. 8 is a fragmentary cross-sectional view of the ejecting mechanism shown in FIG. 7.

As best shown in FIGS. 2 through 4 and 7, the arm 176 of the ejecting member 180 extends through the opening 178 in wall 16 wherein it is movable in response to movement of hook portion 174 of leg 172. The ejecting member 180 is pivotally mounted through an opening in its central portion by a pivot stud 182 which extends between support arms 1844a and 184b (FIG. 8). As shown in FIGS. 7 and 8, a second arm 184 of engaging member 180 includes a tab portion 186 which is bent perpendicular to arm 184 and is positioned with respect to an opening 188 in wall 16 so that it can pivot through the opening to engage and eject a received cartridge 28 from its fully-seated position in the cartridge chamber 12.

A spring 190 normally urges the tab portion 186 in a direction out of the interior of the cartridge chamber 12 to a position wherein tab portion 186 is nearly flush with the surface of wall 16. However, when the operator moves the slide members 120 and 128 to the far right in the direction of arrow 126 (FIG. 1) the urging of spring 190 is overcome by the force applied to arm 176 through hook portion 174. That is, as the operator moves the outer slide member 120 to the right (in the direction of arrow 126) to a position wherein inner slide 128 approaches the end of the travel on rivets 132a and 132b, tab end 164 on slide 128 contacts end 166 of linkage 168 causing it to pivot it in a counter-clockwise direction about pivot stud 170. Through this movement, hook member 174 exerts sufficient force against the arm 176 to pivot the ejecting member 180 about stud 182 against the urging of spring 190. As shown in FIG. 4, the pivotal movement of linkage 168 about pivot stud 170 causes some flexing of hook member 174 permitting relative translational movement of arm 176 of ejecting member 180. This movement of linkage 180 by hook member 174 is effective to urge tab portion 186 into contact with a cartridge 28 and force the end of cartridge 28 which is nearest wall 20 to be moved away from wall 16 as is depicted in FIGS. 4 and 8. When the operator releases outer slide 120, spring 136 urges the outer slide 120 and the inner slide 128 to an intermediate position (not shown) wherein portion 192 of plunger 194 is effective through detent portion 143 to prevent return movement of member 142 as previously disclosed.

After the operator has removed one cartridge from the cartridge chamber 12 and/or positioned a cartridge 28 in the chamber, the door 22 can be manually moved toward its closed (FIG. 1) position. As the door 22 approaches wall 18a, the door engages portion 193 of plunger 194 and then retracts the plunger 194 into opening 196 against the urging of spring 198. When the plunger 194 is moved to its retracted (FIG. 6) position, the portion 192 of plunger 194 is retracted from detent portion 143 of the latching member 142. Then member 142 swings in a clockwise direction about the pivot stud 146 through the urging of spring 136 as previously discussed. When the latching member is again in the FIG. 2 position, pressure roller 36, film guides 80a, 80b, pressure member 58 and loop sensor 110 are free to return to their positions along the film path to permit recording of sound onto the film strip.

While the invention has been described in considerable detail with particular reference to a preferred embodiment, it will be understood that variations and modifications can be effected within the spirit and scope of the invention.

We claim:

1. A sound motion picture camera comprising:
   a. a plurality of walls partially defining a cartridge chamber for receiving a film cartridge of the type having an aperture therein to permit sound to be recorded onto a film strip supported by said cartridge along a predetermined path
   b. a door movable into and out of position relative to said plurality of walls to close a portion of said cartridge chamber;
   c. sound recording means positionable along said path to contact a portion of said film strip for recording of sound onto said film strip;
   d. drive means positionable along said film path for driving said film strip past said transducer means;
   e. guide means positionable along said film path for guiding said film strip past said transducer means;
   f. detection means positionable along said path for sensing the size of a loop of said film strip which is positioned along said path;
   g. latching means positionable for releasably latching said door in the position for closing a portion of said cartridge chamber; and
   h. conditioning means for concurrently moving said transducer means, drive means, guide means, and detection means, from (1) a first condition wherein said transducer means, said drive means, said detection means and said guide means are in close proximity to said path for recording of sound onto said film strip and wherein said latching means latches said door in a position for closing a portion of said cartridge chamber to (2) a second condition wherein at least a portion of said transducer means, drive means, detection means and guide means is separated from said film path by a distance sufficient to permit said film strip to be inserted along said film path or to be removed therefrom and wherein said latching means is ineffective to latch said door in the position for closing a portion of said cartridge chamber.

2. A sound motion picture camera as set forth in claim 1 wherein said camera further comprises an ejecting member movable into said cartridge chamber for ejecting said cartridge from said cartridge chamber when said latching means is removed from said position for latching said door into position for enclosing said chamber, said ejecting member being positionable responsive to said conditioning means.

3. A sound motion picture camera as set forth in claim 1 wherein said transducer means comprises:
   a. a support member supported by one of said plurality of walls at a spaced distance from said predetermined path;
   b. a transducer supported by said support member along said predetermined path for recording sound onto or reproducing sound from said film strip;
   c. a pressure member for urging said film strip into a cooperation with said sound recording means to assist in recording of sound onto or reproducing sound from said film strip;
   d. an arm pivotally supported by one of said plurality of walls, said arm supporting said pressure means for movement between, (1) said first condition wherein said pressure member is in close proximity to said film path, and (2) said second condition wherein said pressure member is retracted a spaced distance from said path to permit said film strip to be inserted along said film path or to be removed therefrom.

4. A sound motion picture camera as set forth in claim 3 wherein said drive means comprises:
   a. a capstan rotatably supported by one of said plurality of walls in close proximity to said film path;
   b. a pressure roller for cooperating with said capstan snd said film strip for driving said film strip along said film path past said transducer means; and
   c. a bracket pivotally supported by one of said walls, said bracket supporting said pressure roller for movement between (1) said first condition wherein said pressure roller is in close proximity to said film path, and (2) said second condition wherein said pressure roller is retracted a spaced distance from said film path to permit said film strip to be inserted along said film path or to be removed therefrom.

5. A sound motion picture camera as set forth in claim 4 wherein said guide means further comprises:
   a. a support member supported by one of said plurality of walls at a spaced distance from said predetermined path;
   b. guide members supported by said support member in close proximity to said predetermined path for guiding said film strip along said path past said transducer means;
   c. film guides positionable in close proximity to said film path to cooperate with said film strip for guiding said film strip along said path; and
   d. an arm movably supported by one of said plurality of walls, said arm supporting said film guides for movement between (1) said first condition wherein said film guides are in close proximity to said film path, and (2) said second condition wherein said film guides are retracted a spaced distance from said film path to permit said film strip to be inserted along said film path or to be removed therefrom.

6. A sound motion picture camera as set forth in claim 5 wherein said detection means comprises:
   a. a loop sensor positionable along said film path for sensing the size of a loop of said film strip which is positioned along said path; and
   b. an arm pivotally supported by one of said plurality of walls, said arm supporting said loop sensor for movement between, (1) said first condition wherein said loop sensor is positioned along said path, and (2) said second condition wherein said loop sensor is retracted a spaced distance from said path to permit said film strip to be inserted along said film path or to be removed therefrom.

7. A sound motion picture camera as set forth in claim 6 further comprising latching means for cooperating with said door into position for enclosing said chamber, said latching means being positionable responsive to said conditioning means.

8. A sound motion picture camera as set forth in claim 7 wherein said camera further comprises an ejecting member movable into said cartridge chamber for ejecting said cartridge from said cartridge chamber when said latching means is positioned by said conditioning means is removed from said position for latching said door into position for enclosing said chamber, said ejecting member being positionable responsive to said conditioning means.

9. In a sound motion picture camera including a cartridge chamber defined by a plurality of walls and a door which is movable into and out of a closed position wherein it is effective to partially close a portion of the cartridge chamber, the cartridge chamber being adapted to receive a sound film cartridge having an aperture therein which provides access to a strip of film supported by the sound cartridge to permit sound to be recorded on the film, the camera further including sound recording means for recording sound onto the film, guide means for guiding the film past the sound recording means, and drive means for advancing the film past the sound recording means, the improvement comprising:

a. pressure means movable between (1) a first position for urging the film toward the sound recording means during recording of sound onto the film and (2) a second position wherein said pressure means is separated from the sound recording means by a distance sufficient to permit the film to be positioned between the sound recording member and said pressure means or to be removed from therebetween;
   b. a film guide movable between (1) a first position for cooperating with the guide means to assist in guiding the film past the sound recording means and (2) a second position wherein said film guide is separated from the guide means by a distance sufficient to permit the film to be positioned between the guide means and said film guide or to be removed from therebetween;
   c. a pressure member movable between (1) a first position wherein it is positioned to cooperate with said drive means to advance the film past the sound recording means and (2) a second position wherein said pressure member is separated from the drive means by a distance sufficient to permit the film to be positioned between the drive means and said pressure member or to be removed from therebetween;
   d. latching means movable between (1) a first position for latching the door in its closed position and (2) a second position wherein said latching means is ineffective for latching the door in its closed position; and
   e. control means for concurrently moving said pressure means, film guide, pressure member and latching means toward their respective second positions.

10. A sound motion picture camera as set forth in claim 9 wherein said control means is coupled to said latching means and said latching means is movable between its first and second positions responsive to movement of said control means between its first position and second positions.

11. A sound motion picture camera as set forth in claim 9 wherein said latching means is coupled to said control means and is movable to its second position responsive to movement of said control means to its second position, and wherein said pressure means, film guide and pressure member are operatively coupled to said latching means and movable to their respective second positions responsive to movement of said latching means to its second position.

12. A sound motion picture camera as set forth in claim 11 wherein said improvement further comprises an ejecting member movable between (1) a first position wherein said ejecting member is retracted relative to the cartridge chamber so that a cartridge can be received in the cartridge chamber and (2) a second position wherein said ejecting member is moved into the cartridge chamber and is thereby effective to urge a received cartridge from the cartridge chamber, said ejecting member being operatively coupled to said control means and being movable toward its second position responsive to movement of said control means to its second position.

13. A sound motion picture camera having a plurality of walls partially defining a cartridge chamber for receiving a film cartridge of the type having an aperture therein to provide access to a strip of film supported by the cartridge along a predetermined film path to permit sound to be recorded onto the film, the camera further having a door which is movable into and out of a closed position relative to said plurality of walls for closing a portion of said film chamber, said camera comprising:

a. sound recording means movable between (1) a first condition wherein said sound recording means is in close proximity to the film path for contacting and recording sound onto a portion of the film in the path and (2) a second condition wherein said sound recording means is separated from the film path by a distance sufficient to permit the film to be inserted along the film path or to be removed therefrom;

b. drive means movable between (1) a first condition wherein said drive means is in close proximity to the film path for engaging and driving the film past said sound recording means and (2) a second condition wherein said drive means is separated from the film path by a distance sufficient to permit the film to be inserted along the film path or to be removed therefrom;

c. guide means movable between (1) a first condition wherein said guide means contacts the film for guiding the film along the film path and (2) a second condition wherein said guide means is separated from the film path by a distance sufficient to permit the film to be inserted along the film path or to be removed therefrom;

d. detection means movable between (1) a first condition wherein said detection means is positioned along the film path for contacting the film and sensing the size of a loop in the film and (2) a second condition wherein said detection means is separated from the film path by a distance sufficient to permit the film to be inserted along the film path or to be removed therefrom;

e. latching means associated with the door, said latching means movable between (1) a first condition wherein said latching means is effective to secure the door in the position for closing a portion of the cartridge chamber and (2) a second condition wherein said latching means is ineffective to secure the door in the position for closing a portion of the cartridge chamber;

f. an ejecting member movable into said cartridge chamber for ejecting a received cartridge from the cartridge chamber when said latching means is moved to said second condition; and g. conditioning means for concurrently moving said sound recording means, drive means, guide means, detection means and latching means toward their respective second conditions, said conditioning means comprising:

i. a slide member slidably secured to said camera, said slide member selectively movable between a first and second condition;

ii. first means for effecting conjoint movement of said slide member and said latching means between their respective first and second conditions;

iii. second means for effecting conjoint movement of said slide member and said drive means to their respective second condition;

iv. third means for effecting conjoint movement of said slide member and said detection means to their respective second condition;

v. fourth means for effecting conjoint movement of said slide member and said guide means to their respective second condition; and vi. fifth means for effecting conjoint movement of said slide member and said sound recording means to their respective second condition.

14. A sound motion picture camera as set forth in claim 13 wherein said first means comprises:

a. a pin secured to said slide member for contacting a portion of said latching means for moving said latching means toward its first condition responsive to movement of said slide member toward its first condition; and b. a spring member operatively coupling said slide member and said latching means to resiliently urge said latching means toward its second condition responsive to movement of said slide member toward its second condition.

15. A sound motion picture camera as set forth in claim 14 wherein said second means comprises:

an arm supported by said latching means, said arm being positioned for cooperating with said drive means for moving said drive means toward its second condition responsive to movement of said latching means toward its second condition.

16. A sound motion picture camera as set forth in claim 15 wherein said third means comprises:

a tab portion supported by said drive means in position for cooperating with said detection means for moving said detection means toward said second condition responsive to movement of said drive means toward its second condition.

17. A sound motion picture camera as set forth in claim 16 wherein said fourth means comprises:

a bracket operatively coupled to said guide means, said bracket including an arm which is engageable by said drive means for moving said guide means toward its second condition as said drive means is moved toward its second condition.

18. A motion picture camera as set forth in claim 13 wherein said sound recording means comprises:

a. a support member supported by one of the plurality of walls and spaced from the film path;

b. a transducer supported by said support member along the film path for recording sound onto the film;

c. an arm pivotally supported by one of the plurality of walls; and d. a pressure member for cooperating with said sound transducer, said pressure member supported by said arm for movement between said first and second conditions.

19. A motion picture camera as set forth in claim 18 wherein said drive means comprises:

a. a capstan rotatably supported by one of the plurality of walls in close proximity to the film path;

b. a bracket pivotally supported by one of the plurality of walls; and c. a pressure roller supported by said bracket for movement between said first and second conditions, said roller being engageable with said capstan and by the film when the drive means is in said first condition whereby the roller is drivable by the capstan and is capable of driving film along the film path.

20. A motion picture camera as set forth in claim 19 wherein said guide means comprises:
   a. an arm movably supported by one of the plurality of walls;
   b. film guides for cooperating with the film for guiding the film along the path, said film guides being supported by said arm for movement between said first and second conditions.

21. A motion picture camera as set forth in claim 20 wherein said detection means comprises:
   a loop sensor positionable along said film path for sensing the size of a loop of said film strip which is located along said path, said loop sensor being supported by said arm for movement between said first and second conditions.

22. In a sound motion picture camera having a plurality of walls and a door partially defining a cartridge chamber which is adapted to receive a sound film cartridge having an aperture therein to provide access to a strip of film supported by the sound film cartridge along a film path in the camera so as to permit sound to be recorded on the film, the improvement comprising:
   a. transducer means movable from (1) a first position wherein said transducer means is in a position along the film path to (2) a second position wherein said transducer means is separated from the film path by a distance sufficient to permit the film to be inserted into or to be removed from the film path;
   b. drive means for driving the film past said transducer means, the drive means being movable from (1) a first condition wherein said drive means is in close proximity to the film path for drivingly engaging the film to (2) a second position wherein said drive means is separated from the film path by a distance sufficient to permit the film to be inserted into or to be removed from the film path;
   c. guide means for engaging and guiding the film strip relative to said transducer means, said guide means being movable from (1) a first position wherein said guide means is in close proximity to said film path for engaging the film to (2) a second position wherein said guide means is separated from the film path by a distance sufficient to permit the film to be inserted into or to be removed from the film path;
   d. detection means for sensing the size of a loop in the film along the film path, said detection means movable from (1) a first position wherein the detection means is located along the film path to (2) a second position wherein said detection means is separated from the film path by a distance sufficient to permit the film strip to be inserted into or to be removed from the film path;
   e. latching means movable from (1) a first position for latching the door in a position for partially closing the cartridge chamber to (2) a second position wherein said latching means is ineffective for latching the door closed; and
   f. conditioning means movable from (1) a first position to (2) a second position for concurrently moving said transducer means, drive means, guide means, detection means and latching means from their first to their second positions.

23. A sound motion picture camera as set forth in claim 22, said camera further comprising an ejecting member movable into the cartridge chamber for ejecting a received cartridge from the cartridge chamber in response to movement of said conditioning means to its second position.

* * * * *